(12) United States Patent
Wetterwald et al.

(10) Patent No.: US 9,801,150 B2
(45) Date of Patent: Oct. 24, 2017

(54) CONTROLLED SYNCHRONIZING OF SENSOR DEVICES IN A WIRELESS SENSOR NETWORK BASED ON RECEIVED DRIFT INFORMATION

(71) Applicant: Cisco Technology, Inc., San Jose, CA (US)

(72) Inventors: Patrick Wetterwald, Mouans Sartoux (FR); Pascal Thubert, La Colle sur Loup (FR); Eric Michel Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 14/740,892

(22) Filed: Jun. 16, 2015

(65) Prior Publication Data

US 2016/0374043 A1 Dec. 22, 2016

(51) Int. Cl.
*H04W 56/00* (2009.01)
*H04W 4/00* (2009.01)

(52) U.S. Cl.
CPC ....... *H04W 56/0045* (2013.01); *H04W 4/005* (2013.01)

(58) Field of Classification Search
CPC .......................... H04W 4/005; H04W 56/0045
USPC .......................................................... 370/350
See application file for complete search history.

(56) References Cited

U.S. PATENT DOCUMENTS

| 7,428,221 | B2 | 9/2008 | Thubert et al. | |
|---|---|---|---|---|
| 8,085,686 | B2 | 12/2011 | Thubert et al. | |
| 8,498,224 | B2 | 7/2013 | Thubert et al. | |
| 2005/0165520 | A1* | 7/2005 | Ariyur | G05B 23/0232 702/190 |
| 2010/0189109 | A1* | 7/2010 | Nakajima | H04J 3/0644 370/395.1 |

OTHER PUBLICATIONS

Yang, et al., "Environment-Aware Clock Skew Estimation and Synchronization for Wireless Sensor Networks", 2012 Proceedings IEEE INFOCOM, pp. 1017-1025.
Palattella, Ed., et al., "Terminology in IPv6 over the TSCH mode of IEEE 802.15.4e", [online], Jan. 8, 2015, [retrieved on Feb. 18, 2015]. Retrieved from the Internet: <URL: http://tools.ietf.org/pdf/draft-ietf-6tisch-terminology-03.pdf>, pp. 1-14.
(Continued)

*Primary Examiner* — Stephen J Clawson
(74) *Attorney, Agent, or Firm* — Leon R. Turkevich (57) ABSTRACT

In one embodiment, a method comprises receiving, by an apparatus from each of a plurality of wireless sensor devices in a wireless sensor network, clock drift information associated with a clock in the corresponding wireless sensor device; determining for each wireless sensor device, by the apparatus, an expected clock drift based at least on the clock drift information from the corresponding wireless sensor device; and sending, by the apparatus to each wireless sensor device, a corresponding drift compensation command for correcting the corresponding expected clock drift, enabling controlled synchronization of the corresponding wireless sensor device within the wireless sensor network.

20 Claims, 4 Drawing Sheets

(56) References Cited

OTHER PUBLICATIONS

Thubert, Ed., "An Architecture for IPv6 over the TSCH mode of IEEE 802.15.4", [online], May 12, 2015, [retrieved on May 19, 2015]. Retrieved from the Internet: <URL: https://tools.ietf.org/pdf/draft-ietf-6tisch-architecture-08.pdf>, pp. 1-42.

Sommer et al., "Gradient Clock Synchronization in Wireless Sensor Networks", [online], ISPN'09, Apr. 13-16, 2009, San Francisco, CA, [retrieved on May 18, 2015]. Retrieved from the Internet: <URL: http://disco.ethz.ch/publications/psn09.pdf>, 12 pages.

Winter, Ed., et al., "RPL: IPv6 Routing Protocol for Low-Power and Lossy Networks", Internet Engineering Task Force, Request for Comments: 6550, Mar. 2012, pp. 1-157.

Vasseur, Ed., et al., "Routing Metrics Used for Path Calculation in Low-Power and Lossy Networks", Internet Engineering Task Force, Request for Comments: 6551, Mar. 2012, pp. 1-30.

Watteyne, Ed., et al., "Using IEEE 802.15.4e Time-Slotted Channel Hopping (TSCH) in the Internet of Things (IoT): Problem Statement", Internet Engineering Task Force, Request for Comments: 7554, May 2015, pp. 1-23.

Rhee et al., "Clock Synchronization in Wireless Sensor Networks: An Overview", [online] Jan. 6, 2009, [retrieved pn May 4, 2015]. Retrieved from the Internet: <URL: http://www.ncbi.nlm.nih.gov/pmc/articles/PMC3280734/pdf/sensors-09-00056.pdf>, pp. 56-85.

Castillo-Secilla et al., "Temperature-Compensated Clock Skew Adjustment", [online], Aug. 20, 2013, [retrieved on May 18, 2015]. Retrieved from the Internet: <URL: http://www.google.com/url?sa=t&rct=j&q=esrc=s&source=web&cd=2&cad=rja&uact=8&ved=0CCoQFjAB&url=http%3A%2F%2Fwww.mdpi.com%2F1424-8220%2F13%2F8%2F10981%2Fpdf&ei=4U5aVaPfJYvbsASohoKoCw&usg=AFQjCNFcFXhiE2lvf-KIYAlthEpY4mx__GQ&bvm=bv.93564037,d.cWc>, pp. 10981-11006.

Wikipedia, "Machine learning", [online], May 19, 2015, [retrieved on May 19, 2015]. Retrieved from the Internet: <URL: http://en.wikipedia.org/w/index.php?title=Machine_learning&printable=yes>, pp. 1-11.

Wikipedia, "Time complexity", [online], May 16, 2015, [retrieved on May 19, 2015]. Retrieved from the Internet: <URL: http://en.wikipedia.org/w/index.php?title=Time_complexity&printable=yes>, pp. 1-12.

Thubert et al., U.S. Appl. No. 14/642,066, filed Mar. 9, 2015.

* cited by examiner

# CONTROLLED SYNCHRONIZING OF SENSOR DEVICES IN A WIRELESS SENSOR NETWORK BASED ON RECEIVED DRIFT INFORMATION

TECHNICAL FIELD

The present disclosure generally relates to controlled synchronizing of sensor devices in a wireless sensor network based on received drift information.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A wireless sensor network (WSN) is a distributed data network of wireless sensor devices. Such wireless sensor devices typically are implemented as resource-constrained devices, for example small, low-cost, low-power, battery-operated devices that are implemented based on micro-electro-mechanical systems (MEMS) technology. The wireless sensor network can be implemented based on random deployment of a large number (e.g., tens of thousands) of the wireless sensor devices over a wide geographical region.

The Internet Engineering Task Force (IETF) has proposed a routing protocol ("6TiSCH") that provides IPv6 routing using time slotted channel hopping (TSCH) based on IEEE 802.15.4e, enabling wireless sensor devices to use low-power operation and channel hopping for higher reliability. Such time slotted channel hopping requires effective time synchronization between wireless sensor devices.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises receiving, by an apparatus from each of a plurality of wireless sensor devices in a wireless sensor network, clock drift information associated with a clock in the corresponding wireless sensor device; determining for each wireless sensor device, by the apparatus, an expected clock drift based at least on the clock drift information from the corresponding wireless sensor device; and sending, by the apparatus to each wireless sensor device, a corresponding drift compensation command for correcting the corresponding expected clock drift, enabling controlled synchronization of the corresponding wireless sensor device within the wireless sensor network.

In another embodiment, an apparatus comprises a device interface circuit and a processor circuit. The device interface circuit is configured for receiving, from each of a plurality of wireless sensor devices in a wireless sensor network, clock drift information associated with a clock in the corresponding wireless sensor device. The processor circuit is configured for determining, for each wireless sensor device, an expected clock drift based at least on the clock drift information from the corresponding wireless sensor device. The processor circuit further is configured for generating, for transmission by the device interface circuit to each wireless sensor device, a corresponding drift compensation command for correcting the corresponding expected clock drift. The drift compensation command enables controlled synchronization of the corresponding wireless sensor device within the wireless sensor network.

In another embodiment, one or more non-transitory tangible media are encoded with logic for execution by a machine, and when executed by the machine operable for: receiving, by the machine from each of a plurality of wireless sensor devices in a wireless sensor network, clock drift information associated with a clock in the corresponding wireless sensor device; determining for each wireless sensor device, by the machine, an expected clock drift based at least on the clock drift information from the corresponding wireless sensor device; and sending, by the machine to each wireless sensor device, a corresponding drift compensation command for correcting the corresponding expected clock drift, enabling controlled synchronization of the corresponding wireless sensor device within the wireless sensor network.

DETAILED DESCRIPTION

Particular embodiments enable a controlled synchronizing of wireless sensor devices within a wireless sensor network, based on an apparatus (e.g., network sync controller implemented in a path computation element (PCE)) receiving clock drift information from each of the wireless sensor devices, determining an expected clock drift, and sending to each wireless sensor device a corresponding drift compensation command for correcting the expected clock drift.

Figure 1:
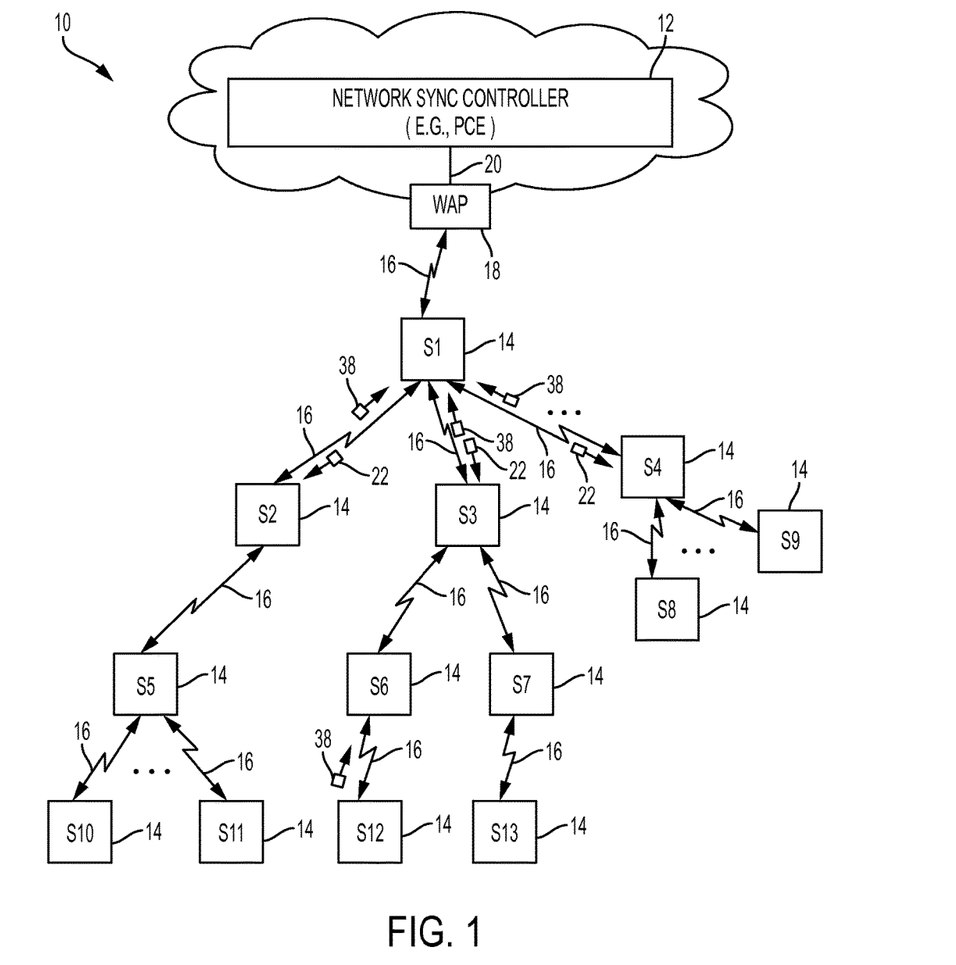
FIG. 1 illustrates an example wireless sensor network having an apparatus for controlling synchronizing of wireless sensor network devices based on received drift information, according to an example embodiment.

FIG. 1 illustrates an example wireless sensor network 10 having an apparatus 12 and wireless sensor devices 14, according to an example embodiment. The apparatus 12, also referred to herein as a network sync controller, is configured for controlling synchronizing of wireless sensor network devices 14 based on received drift information, described in further detail below. The apparatus 12 is a physical machine (i.e., a hardware device) configured for implementing network communications with other physical machines 14 via the wireless sensor network 10. The wireless sensor devices 14 can send sensor data messages to the network sync controller 12 (or any other sensor consumer device) via wireless data links 16 (e.g., IEEE 802.15.4e wireless data links utilizing TSCH or 6TiSCH). If the network sync controller 12 does not include a wireless transceiver for establishing a wireless data link 16, the wireless sensor network 10 also can include a wireless access point (WAP) 18 providing a wired data link 20 to the` network sync controller 12 (e.g., as part of a wired network infrastructure such as a local area network), enabling the network sync controller 12 to send and receive data packets (e.g., IEEE 802.15.4e MAC frames) to and from the wireless sensor devices 14 via the wired data link 20 and the wireless data links 16.

The wireless sensor network 10 may include a large number of the wireless sensor devices 14, for example tens of thousands randomly dispersed over a wide geographical area or region. The wireless sensor devices 14 are implemented as resource-constrained devices, for example small, low-cost, low-power, battery-operated devices that are implemented based on MEMS technology (e.g., an Internet of Things (IoT) enabled sensor device or "mote"). The wireless sensor devices 14 can be configured for establishing a mesh network and/or a tree-based topology (e.g., a destination oriented directed acyclic graph (DODAG)) for reaching the network sync controller 12, for example according to the IETF Request for Comments (RFC) 6550.

Since the wireless sensor network 10 may include tens of thousands of wireless sensor devices 14, the wireless sensor devices 14 can be configured for utilizing time slotted channel hopping (TSCH) or 6TiSCH, under the control of the network sync controller 12 operating for example as a PCE; alternately, the network sync controller 12 and the PCE can be implemented in distinct physical devices. Accurate time synchronization between neighboring wireless sensor devices 14 is desirable to ensure reliable data transmission between neighboring wireless sensor devices 14 according to TSCH or 6TiSCH. Poor synchronization between neighboring wireless sensor devices 14 can result in lost data packets, and/or excessive energy consumption by the wireless sensor devices 14. Excessive energy consumption by the wireless sensor devices 14 can be caused by efforts to mitigate poor synchronization, including reducing "sleep" intervals to detect MAC frames from neighboring devices (e.g., increasing guard times), retransmitting data packets, etc. Excessive energy consumption by the wireless sensor devices 14 also may arise due to network topology changes, where a wireless sensor device 14 (e.g., "S3") moves from one "parent" network device (e.g., "S1") to another parent network device (e.g., "S2").

Prior clock synchronization protocols assume that each network device synchronizes to a "master network clock", for example to correct for a temperature variation that affects the oscillation frequency of a quartz crystal used to generate the clock in a wireless sensor device 14. Such synchronizing to a "master network clock", however, does not address short-term or long-term variations that are invariably encountered in large sensor networks, including variations due to environmental conditions, internal device conditions, and/or network conditions encountered by wireless sensor devices over time. Moreover, synchronizing to a "master network clock" does not address variations encountered due to network-based events, for example network topology changes, network traffic, deterioration of a wireless sensor device serving as a parent network device in a tree-based network topology, etc.

According to an example embodiment, the network sync controller 12 is configured for receiving clock drift information from each wireless sensor device 14, where the clock drift information describes apparent clock drift "encountered" by the wireless sensor device 14. The clock drift information (36 of FIGS. 4A and 4B) can be received in the form of a clock drift information message 38. The network sync controller 12 can execute machine learning based on the received clock drift information 36, determined network information (e.g., network topology, network traffic), etc., to determine the expected clock drift for each wireless sensor device (e.g., "S5") 14 relative to neighboring wireless sensor devices (e.g., "S2", "S10" and "S11") 14. In other words, the network sync controller 12 does not determine clock drift of a wireless sensor device 14 relative to a master clock; rather, the network sync controller 12 can determine the expected clock drift (e.g., a polynomial approximation of the expected clock drift for an upcoming prescribed time interval) for a given wireless sensor device 14, relative to neighboring wireless sensor devices 14 (i.e., a "neighbor" is a wireless sensor device (e.g., "S5") that establishes a wireless data link 16 with another wireless sensor device (e.g., "S2"). Consequently, the network sync controller 12 can establish a "timing-based topological map" of the wireless sensor network 10 that identifies the relationship between the wireless sensor devices 14 in the time domain, relative to network topology and network traffic.

The network sync controller 12 can generate, as an optimization of the timing-based topological map, a corresponding drift compensation command 22 for each wireless sensor device 14: the corresponding drift compensation command 22 enables the wireless sensor device (e.g., "S5") 14 to correct for its expected clock drift relative to its neighboring wireless sensor devices (e.g., "S2", "S10", "S11"). In other words, the network sync controller 12 can provide controlled synchronization of a wireless sensor device 14 based on synchronizing the wireless sensor device 14 to an optimized timing relationship within the wireless sensor network 10 relative to its neighboring wireless network devices 14.

Hence, the drift compensation commands 22 generated and output by the network sync controller 12 enables controlled synchronization of the respective wireless sensor devices 14 within the wireless sensor network 10, based on the distributed execution of the drift compensation commands 22 by the respective wireless sensor devices 14, resulting in the wireless sensor network 10 converging toward the optimization of the timing-based topological map. The controlled synchronization enables a wireless sensor device 14 to maximize the time it can remain "asleep" in a power-saving mode and minimize the time needed to "wake up" in a transmit/receive mode for forwarding a received data packet, based on the optimized timing relationship established with its neighboring wireless network devices 14. If necessary, the drift compensation command 22 can include instructions for increased listening by a wireless sensor device 14 requiring additional synchronization intervals with a neighboring sensor device ("piggybacking" off of a neighbor's clock); the drift compensation command 22 also can include instructions that cause a wireless sensor device 14 to move to a lower position ("rank") within a topology to minimize adverse timing effects in network traffic (e.g., moving the wireless sensor device from a "parent" position to a "leaf" position in a tree-based network topology).

Figure 2:
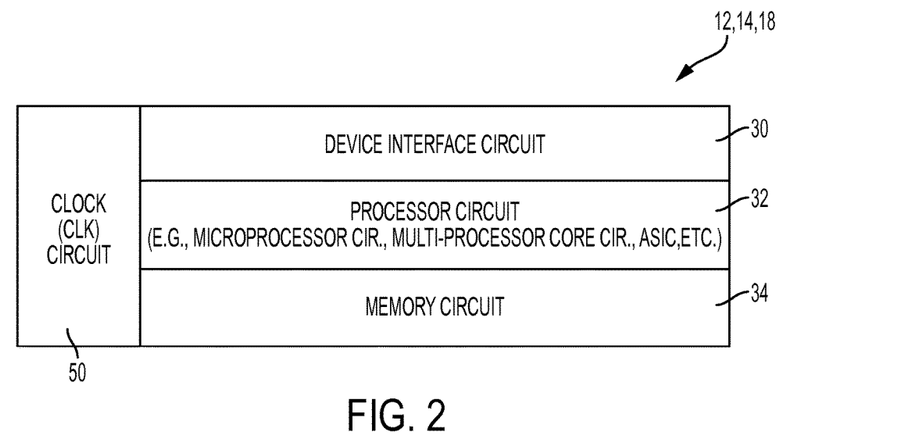
FIG. 2 illustrates any one of the network sync controller or the wireless sensor devices of FIG. 1, according to an example embodiment.

FIG. 2 illustrates an example implementation of any one of the devices 12, 14, and/or 18 of FIG. 1, according to an example embodiment. Each apparatus 12, 14, and/or 18 can include a device interface circuit 30, a processor circuit 32, a memory circuit 34, and a clock circuit 50.

The device interface circuit 30 can include one or more distinct physical layer transceivers for communication with any one of the other devices 12, 14, and/or 18; the device interface circuit 30 also can include an IEEE based Ethernet transceiver (e.g., IEEE 802.15.4e) for communications with the devices of FIG. 1 via any of the links 16 and/or 20. The processor circuit 32 can be configured for executing any of the operations described herein, and the memory circuit 34 can be configured for storing any data or data packets as described herein. The term "configured for" or "configured to" as used herein with respect to a specified operation refers to a device and/or machine that is physically constructed and arranged to perform the specified operation.

Any of the disclosed circuits of the devices 12, 14, and/or 18 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 3:
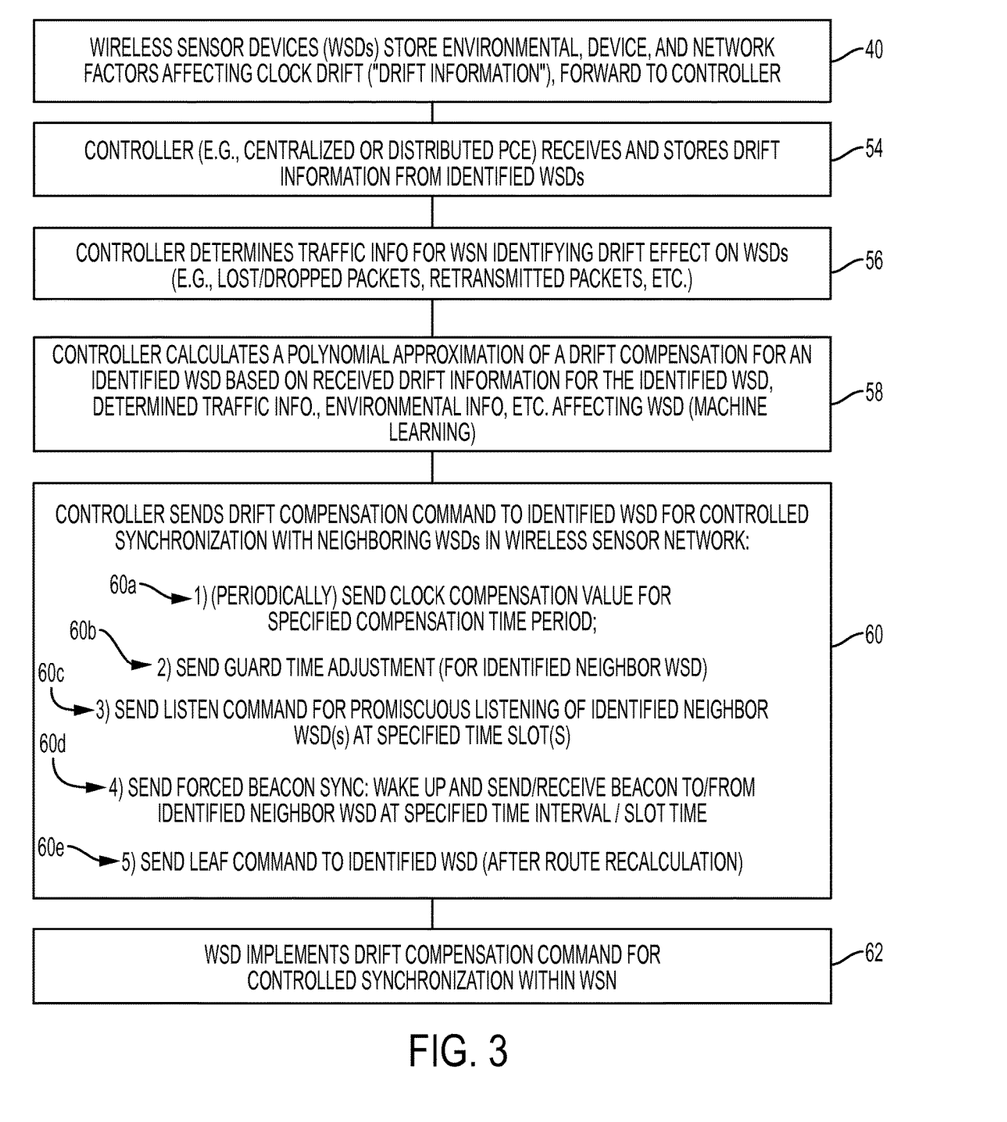
FIG. 3 illustrates an example method of an apparatus controlling synchronizing of wireless sensor network devices based on received drift information, according to an example embodiment.

FIG. 3 illustrates an example method of an apparatus controlling synchronizing of wireless sensor network devices based on received drift information, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Figure 4A:
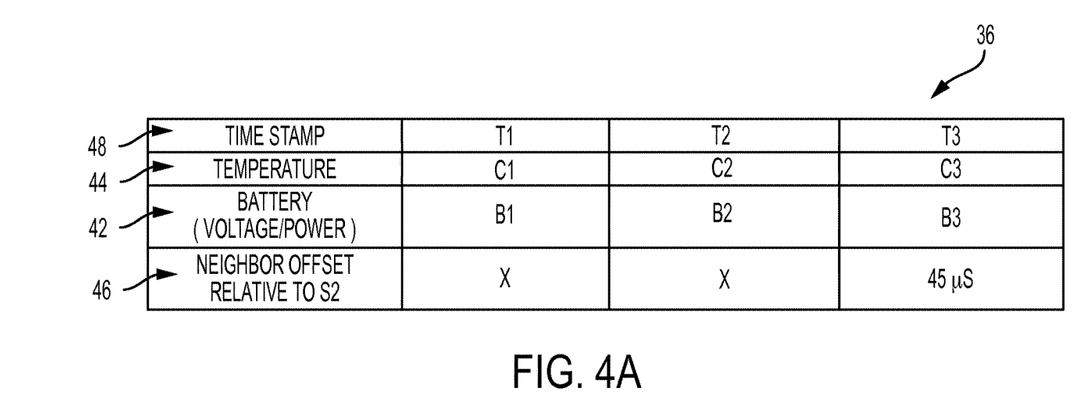
FIGS. 4A and 4B illustrate example drift information sent by a wireless sensor device to the controller of FIG. 1, according to an example embodiment.
Figure 4B:
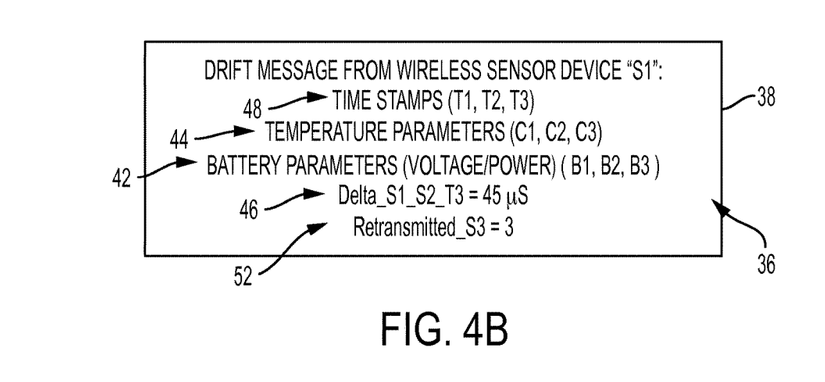

Referring to FIG. 3, each of the wireless sensor devices (WSDs) 14 of the wireless sensor network 10 in operation 40 can store clock drift information (36 of FIG. 4A), and output the clock drift information to the network sync controller 12, for example in the form of a clock drift information message (38 of FIGS. 1 and 4B). FIGS. 4A and 4B illustrate example drift information 36 sent by a wireless sensor device to the controller of FIG. 1, according to an example embodiment.

Each wireless sensor device 14 can output clock drift information 36 associated with a clock 50 in the corresponding wireless sensor device 14, including for example sensor device information (e.g., device age, battery voltage/power 42, etc., device activity, transceiver activity, etc.), environmental information (e.g., temperature 44, ambient pressure, shock/vibration values, corrosion-causing attributes, etc.), or network-based information (e.g., transmit/receive parameters or statistics, traffic load, neighbor offsets 46 identifying clock offsets relative to neighboring wireless sensor devices, etc.).

Each wireless sensor device 14 can be configured for operating in three or more operational states: a power-saving "sleep" state during which the corresponding device interface circuit 30 is powered off and the corresponding processor circuit 32 is in a minimally-powered idle state awaiting an interrupt or an indication to "wake up" for processor activity; an "awake" state during which the device interface circuit 30 is still powered off but the processor circuit 32 transitions from the "sleep" state to a higher-powered state to perform processor operations; and an "active" state during which the processor circuit 32 transitions from the "awake" mode and the device interface circuit 30 is powered up to transmit and receive data packets (e.g., IEEE 802.15.4e MAC frames). Hence, each wireless sensor device 14 can transition from a "sleep" state to either "awake" state or an "active" state, and return to a "sleep" state to conserve battery power.

Hence, each wireless sensor device 14 can periodically "wake up" from a "sleep" state to an "awake" state (e.g., every ten (10) minutes) in order to measure and store sensor device information (e.g., device age, battery voltage/power 42, etc., device activity, transceiver activity, etc.), and/or environmental information (e.g., temperature 44, ambient pressure, shock/vibration values, corrosion-causing attributes, etc.). FIGS. 4A and 4B illustrates that a wireless sensor device (e.g., "S1") 14 wakes up and operates in an "awake" state at time stamp "T1" 48, and the processor circuit 32 can store sensed parameters for a temperature value "C1" (e.g., in Celsius) 44 and a battery voltage/power value "B1" (e.g., in volts or milliwatts) 42 in its memory circuit 34. Following storage of the values "B1" 42, "C1" 44 and "T1" 48 the wireless sensor device 14 can return to the "sleep" state until the next prescribed "awake" state (e.g., ten (10) minutes). During the next "awake" state at time stamp "T2" 48 the processor circuit 32 of the wireless sensor device 14 can store the next sensed values "B2" 42, "C2" 44 and "T2" 48 in its memory circuit 34, and return to the "sleep" state.

The next prescribed interval "T3" of the wireless sensor device 14 can be an "active" state, during which time the processor circuit 32 of the wireless sensor device (e.g., "S1") 14 can power up the device interface circuit 30 to exchange data packets with a neighboring wireless sensor device (e.g., "S2") 14 and/or forward the data packets toward the prescribed destination (e.g., network sync controller 12) in the prescribed network topology of the wireless sensor network 10. Each data packet transmitted by wireless sensor devices 14 in the wireless sensor network 10 can include timing information (e.g., a clock reference "S2_CLK") that enables the processor circuit 32 of the receiving wireless sensor device (e.g., "S1") 14 to determine a neighbor offset 46 relative to the transmitting neighbor (e.g., "S2") 14 at the given time stamp "T3" 48; hence, the processor circuit 32 can determine the neighbor offset (e.g., "Delta_S1_S2_T3") based on the difference between the clock reference "S2_CLK" specified in the received data packet and the determined clock reference "S1_CLK_T3" sampled from the clock circuit 50 at the time stamp "T3" (e.g., the actual value of the time stamp "T3" 48:

$$Delta\_S1\_S2\_T3=S2\_CLK-S1\_CLK\_T3$$

The processor circuit 32 can store the determined neighbor offset (e.g., "Delta_S1_S2_T3=45 μs") 46 in its memory circuit 34 and either go back to sleep to await collecting more clock drift information 36, or transmit the clock drift information 36 in operation 40 of FIG. 3 toward the network sync controller 12 following each data exchange with another wireless sensor device 14. In the case of wireless sensor devices 14 serving as parent network devices (e.g., S1-S7) in the tree-based topology of FIG. 1, each parent network device 14 can either forward each clock drift information message 38 as a separate message, or can aggregate the clock drift information 36 from each received clock drift information message 38 into a single clock drift information message 38 comprising all the clock drift information 36 from the respective "child" network devices 14 (further details with respect to network devices in a tree-based topology aggregating information for a destination such as a clusterhead is described for example in U.S. Pat. No. 7,428,221). Hence, the processor circuit 32 of a wireless sensor device 14 can be configured for causing the corresponding device interface circuit 30 to output the clock drift information message 38 on at least one of a periodic basis or an event-driven basis, in accordance with any scheduling established by the PCE.

Hence, each of the wireless sensor devices 14 in operation 40 store clock drift information 36 in their respective memory circuits 34 for transmission in a clock drift information 36 to the network sync controller 12, for example during the next "active" state. Further, each wireless sensor device 14 can determine a corresponding neighbor offset 46 based on comparing timing information (e.g., a time stamp 48) specified in a received data frame with its internal clock circuit 50. Hence, each wireless sensor device (e.g., "S5") 14 will eventually forward to the network sync controller 12, via one or more clock drift information messages 38, the relative neighbor offset 46 between the wireless sensor device (e.g., "S5") 14 and its neighbor devices (e.g., "S2", "S10", and "S11") 14, enabling the network sync controller 12 to determine the relative offset between the wireless sensor device (e.g., "S5") 14 and its neighbor devices (e.g., "S2", "S10", and "S11") 14.

FIG. 4B illustrates that the clock drift information message 38 transmitted by the wireless sensor device (e.g., "S1") 14 also can specify the number of lost or retransmitted data packets 52 by an identified neighbor (e.g., "S3"), indicating that the neighboring wireless sensor device "S3" need to retransmit three (3) data packets since the last reporting interval.

Hence, the device interface circuit 30 of the network sync controller 12 is configured for receiving, from each of the wireless sensor devices 14, clock drift information 36 (e.g., in the form of a clock drift information message 38) that is associated with the clock circuit 50 of the corresponding wireless sensor device 14: as apparent from the foregoing, the clock drift information 36 can be associated with the clock circuit 50 of a wireless sensor device 14 either as an environmental factor influencing the operation of the clock circuit 50 (e.g., temperature 44, humidity, shock/vibration, detectable corrosive materials affecting battery life such as a marine environment, etc.), sensor device factors influencing the operation of the clock circuit 50 (e.g., device age, battery voltage/power value 42, etc.), and/or network factors that affect the energy consumption of the clock circuit 50 (e.g., traffic load, guard time values) or the relative "alignment" with respect to neighboring wireless sensor devices 14 (e.g., neighbor offset 46).

In response to receiving in operation 54 the clock drift information 36 from each of the wireless sensor devices 14, the processor circuit 32 of the network sync controller 12 is configured for storing the clock drift information 36 and determining in operation 56 the associated traffic information from the wireless sensor network (WSN) 10, including network topology, lost/retransmitted data packets, transmission activity by each of the wireless sensor devices 14, burst transmission statistics, traffic loads, etc. The network sync controller 12 can determine at least part of the traffic information from the allocated time-slotted channel hop (TSCH) schedules allocated by the PCE according to TSCH or 6TiSCH.

The processor circuit 32 of the network sync controller 12 is configured for determining in operation 58, for each wireless sensor device 14, an expected clock drift based at least on the clock drift information 36 from the corresponding wireless sensor device 14. For example, the processor circuit 32 of the network sync controller 12 can execute machine learning, based on the traffic information in operation 56 and the clock drift information 36 received in operation 54, to determine a polynomial approximation of the expected clock drift for each wireless sensor device 14 in the wireless sensor network 10: the polynomial approximations of the expected clock drift for all of the wireless sensor devices 14 can be aggregated to form the above-described timing-based topological map of the wireless sensor network 10 for at least an upcoming time interval. Hence, the timing-based topological map of the wireless sensor network 10 generated by the processor circuit 32 of the network sync controller 12 can identify the relationships between each of the wireless sensor devices 14 in the time domain, relative to the network topology and the expected network traffic (at least within the upcoming prescribed time interval such as the next time slot).

The processor circuit 32 of the network sync controller 12 in operation 58 also is configured for generating for each wireless sensor device 14, based on the corresponding expected clock drift, a corresponding drift compensation command 22 for correcting the corresponding expected clock drift, for example based on a machine learning-based optimization of the timing-based topological map. In other words, the drift compensation command 22 generated for a given wireless sensor device 14 enables the wireless sensor device 14 to "tune" itself toward optimization of the timing-based topological map, such that the drift compensation command 22 enables controlled synchronization of the targeted wireless sensor device 14 within the wireless sensor network 10 (as represented by the optimization of the timing-based topological map).

Hence, the device interface circuit 30 of the network sync controller 12 outputs in operation 60 a specific drift compensation command (e.g. "Command_S1") 22 to each corresponding identified wireless sensor device (e.g., "S1"), enabling each wireless sensor device 14 to synchronize itself toward the optimization of the timing-based topological map of the wireless sensor network 10.

For example, the processor circuit 32 of the network sync controller 12 may generate and send in the drift compensation command 22 a clock compensation value (operation 60*a*), to be used by a wireless sensor device 14 to correct for the expected clock drift for a specified compensation time period. For example, assuming the processor circuit 32 of the network sync controller 12 determines the wireless sensor devices "S5" and "S11" 14 have a determined clock offset of thirty (30) microseconds (µs) and the wireless sensor devices "S5" and "S2" have a determined clock offset of fifteen (15) µs, the processor circuit 32 of the network sync controller 12 can generate a first instruction directing the wireless sensor device "S5" 14 to increase its offset by fifteen (15) µs and a second instruction directing the wireless sensor device "S11" to decrease its offset by fifteen (15) µs, resulting in a zero relative offset between the wireless sensor devices "S5" and "S11" 14 and a zero relative offset between the wireless sensor devices "S5" and "S2" 14. The drift compensation command 22 also can include an option that triggers the target wireless sensor device 14 to sync with its neighboring wireless sensor devices 14 upon completing its clock compensation using the supplied clock compensation value.

The network sync controller 12 can repeat transmission of a clock compensation value in operation 60*a* on a periodic basis for each successive time interval (e.g., for each slot time within the timing domain of the wireless sensor network 10).

The processor circuit 32 of the network sync controller 12 may determine that certain node pairs (e.g., "S5" and "S10") require a guard time adjustment; hence, the processor circuit 32 of the network sync controller 12 can generate and send in the drift compensation command 22 in operation 60*b* a guard time adjustment to be used for an identified neighboring wireless sensor device 14. For example, the wireless sensor device "S5" can be instructed to increase its guard time for scheduled communications with the wireless sensor device "S10" due to larger relative drift between the wireless sensor devices "S5" and "S10"; the wireless sensor device "S5" also can be instructed to reduce its guard time for scheduled communications with the wireless sensor device "S11" due to minimal relative drift between the wireless sensor devices "S5" and "S11". Hence, the increased guard time can ensure reliable data packet reception between wireless sensor devices 14 having larger relative drift, and the reduced guard time can improve battery efficiency between wireless sensor devices 14 having lower relative drift since the reduced guard time enables the wireless sensor device 14 to remain in a "sleep" state for a longer relative time.

The processor circuit 32 of the network sync controller 12 can generate and send in the drift compensation command 22 in operation 60*c* a listen command to a target wireless sensor device 14, for promiscuous listening by the target wireless sensor device (e.g., "S8") 14 to an identified neighbor wireless sensor device (e.g., "S4") 14 at one or more prescribed times (e.g., at specified time slots). Hence, the promiscuous listening enables the target wireless sensor device (e.g., "S8") 14 to promiscuously listen to the neighbor wireless sensor device (e.g., "S4") 14 in order to enable the target wireless sensor device (e.g., "S8") 14 to synchronize with transmissions by the neighbor wireless sensor device (e.g., "S4") 14 (e.g., communications with the parent wireless sensor device "S1" 14 and/or the child wireless sensor device "S9" 14). If necessary, the target wireless sensor device (e.g., "S8") 14 can be instructed to promiscuously listen to the identified neighbor wireless sensor device (e.g., "S4") 14 during each and every slot time (e.g., if the target wireless sensor device (e.g., "S8") 14 has a very unstable clock).

As described previously, the wireless sensor devices 14 may have a relatively long "sleep" state, for example fifteen (15) minutes, during which the relative clock offset between two neighboring devices may drift past the allocated guard time. Hence, the processor circuit 32 of the network sync controller 12 can generate and send in the drift compensation command 22 in operation 60*d* a forced beacon sync command for beacon synchronization by a target wireless sensor device (e.g., "S7") 14 with an identified neighbor wireless sensor device (e.g., "S13") 14 at one or more prescribed times (e.g., every five (5) minutes). Hence, the forced beacon sync command enables the wireless sensor devices "S7" and "S13" to maintain their relative offset within the allocated guard time based on the forced beacon sync every five minutes.

In some cases a target wireless sensor device (e.g., "S3") may have relatively severe clock drift that affects reliable transmission of network traffic in the tree-based network topology. Hence, the processor circuit 32 of the network sync controller 12 can generate and send in the drift compensation command 22 in operation 60*e* a "leaf" command that causes the target wireless sensor device (e.g., "S3") to reposition itself as a leaf node within the wireless sensor network 10. Typically the network sync controller 12 will send a "reattach" command to any children "S6" and "S7" prior to sending the leaf command to the target wireless sensor device (e.g., "S3"). Hence, the network sync controller 12 first can send a "reattach" command instructing the wireless sensor device "S6" to reattach to the wireless sensor device "S2" and another "reattach" command instructing the wireless sensor device "S7" to reattach to the wireless sensor device "S8", followed by the leaf command instructing the target wireless sensor device "S3" to move from parent "S1" to the new parent "S8". Hence, the wireless sensor device "S3" 14 can be instructed to move from a "parent" position (attached to the wireless sensor device "S1") in the tree-based topology to a "leaf" position (attached to the wireless sensor device "S8") to minimize adverse effects by the wireless sensor device "S3" 14.

An alternative to the leaf command can be a drift compensation command 22 including a "detach and rejoin" instruction that causes a wireless sensor device (e.g., "S3") 14 to detach from its current point of attachment (e.g., "S1") in the wireless sensor network 10 and rejoin at another point of attachment in the wireless sensor network 10. Alternately, the drift compensation command 22 can specify an "exclude" command to a parent wireless sensor device (e.g., "S1") 14 and identifying a target wireless sensor device (e.g., "S3") 14, causing the parent wireless sensor device (e.g., "S1") to break its communications with the target wireless sensor device (e.g., "S3") 14 in order to force the target wireless sensor device (e.g., "S3") 14 to rejoin the wireless sensor network 10 at another location.

Each wireless sensor device 14 can respond to its specific drift compensation command 22 in operation 62, enabling the controlled synchronization within the wireless sensor network 10 under the coordinated control by the network sync controller 12.

According to example embodiments, a centralized network sync controller 12 can provide coordinated control in synchronizing of the wireless sensor devices 14 in the wireless sensor network 10 based on received clock drift information 36 from each of the wireless sensor devices 14. The network sync controller 12 can calculate a polynomial approximation of the expected clock drift (for an upcoming prescribed time interval) for a given wireless sensor device 14, relative to neighboring wireless sensor devices, and generate a corresponding drift compensation command 22 for the corresponding wireless sensor device 14. Hence, the example embodiments enable a controlled synchronization of each of the wireless sensor devices 14 based on the network-wide evaluation by the network sync controller 12.

Although the example embodiments illustrate a single network sync controller, the network sync controller 12 can be implemented in plural devices. The network sync controller and the PCE also can be implemented in separate devices and can communicate via a data link. The example embodiments also are not limited to a tree topology, as a directed acyclic graph (DAG) or other topology overlaying a mesh network can be employed.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
  receiving, by an apparatus from each of a plurality of wireless sensor devices in a wireless sensor network, clock drift information associated with a clock in the corresponding wireless sensor device;
  determining for each wireless sensor device, by the apparatus, an expected clock drift based at least on the clock drift information from the corresponding wireless sensor device;
  sending, by the apparatus to each wireless sensor device, a corresponding drift compensation command for correcting the corresponding expected clock drift, enabling controlled synchronization of the corresponding wireless sensor device within the wireless sensor network; and
  determining network traffic information for identifying a drift effect on one or more of the wireless sensor devices, the determining of the expected clock drift including determining the expected clock drift based on at least a portion of the network traffic information.

2. The method of claim 1, wherein the network traffic information includes an identification of at least one of a lost data packet, or a retransmitted data packet by the one or more wireless sensor devices.

3. The method of claim 1, wherein the drift compensation command to one or more of the wireless sensor devices specifies a corresponding clock compensation value to be used by the one or more wireless sensor device to correct for the corresponding expected clock drift for a specified compensation time period.

4. The method of claim 1, wherein the drift compensation command to one or more of the wireless sensor devices specifies a corresponding guard time adjustment to be used for communications with an identified neighbor wireless sensor device.

5. The method of claim 1, wherein the drift compensation command to one or more of the wireless sensor devices specifies a listen command for promiscuous listening to an identified neighbor wireless sensor device at one or more prescribed times, the promiscuous listening enabling the one or more wireless sensor devices to synchronize to the identified neighbor wireless sensor device.

6. The method of claim 1, wherein the drift compensation command to one or more of the wireless sensor devices specifies a forced beacon sync command for beacon synchronization by the one or more wireless sensor devices with an identified neighbor wireless sensor device at one or more prescribed times.

7. The method of claim 1, wherein the drift compensation command to one or more of the wireless sensor devices specifies a leaf command that causes the one or more of the wireless sensor devices to reposition as a leaf node within the wireless sensor network.

8. An apparatus comprising:
  a device interface circuit configured for receiving, from each of a plurality of wireless sensor devices in a wireless sensor network, clock drift information associated with a clock in the corresponding wireless sensor device; and
  a processor circuit configured for determining, for each wireless sensor device, an expected clock drift based at least on the clock drift information from the corresponding wireless sensor device, the processor circuit further configured for generating, for transmission by the device interface circuit to each wireless sensor device, a corresponding drift compensation command for correcting the corresponding expected clock drift, enabling controlled synchronization of the corresponding wireless sensor device within the wireless sensor network;
  wherein the processor circuit further is configured for determining network traffic information for identifying a drift effect on one or more of the wireless sensor devices, including determining the expected clock drift based on at least a portion of the network traffic information.

9. The apparatus of claim 8, wherein the network traffic information includes an identification of at least one of a lost data packet, or a retransmitted data packet by the one or more wireless sensor devices.

10. The apparatus of claim 8, wherein the drift compensation command to one or more of the wireless sensor devices specifies a corresponding clock compensation value to be used by the one or more wireless sensor device to correct for the corresponding expected clock drift for a specified compensation time period.

11. The apparatus of claim 8, wherein the drift compensation command to one or more of the wireless sensor devices specifies a corresponding guard time adjustment to be used for communications with an identified neighbor wireless sensor device.

12. The apparatus of claim 8, wherein the drift compensation command to one or more of the wireless sensor devices specifies a listen command for promiscuous listening to an identified neighbor wireless sensor device at one or more prescribed times, the promiscuous listening enabling the one or more wireless sensor devices to synchronize to the identified neighbor wireless sensor device.

13. The apparatus of claim 8, wherein the drift compensation command to one or more of the wireless sensor devices specifies a forced beacon sync command for beacon synchronization by the one or more wireless sensor devices with an identified neighbor wireless sensor device at one or more prescribed times.

14. The apparatus of claim 8, wherein the drift compensation command to one or more of the wireless sensor devices specifies a leaf command that causes the one or more of the wireless sensor devices to reposition as a leaf node within the wireless sensor network.

15. One or more non-transitory tangible media encoded with logic for execution by a machine and when executed by the machine operable for:
  receiving, by the machine from each of a plurality of wireless sensor devices in a wireless sensor network, clock drift information associated with a clock in the corresponding wireless sensor device;
  determining for each wireless sensor device, by the machine, an expected clock drift based at least on the clock drift information from the corresponding wireless sensor device;
  sending, by the machine to each wireless sensor device, a corresponding drift compensation command for correcting the corresponding expected clock drift, enabling controlled synchronization of the corresponding wireless sensor device within the wireless sensor network; and
  determining network traffic information for identifying a drift effect on one or more of the wireless sensor devices, the determining of the expected clock drift including determining the expected clock drift based on at least a portion of the network traffic information.

16. The one or more non-transitory tangible media of claim 15, wherein the drift compensation command to one or more of the wireless sensor devices specifies a corresponding clock compensation value to be used by the one or more wireless sensor device to correct for the corresponding expected clock drift for a specified compensation time period.

17. The one or more non-transitory tangible media of claim 15, wherein the drift compensation command to one or more of the wireless sensor devices specifies a corresponding guard time adjustment to be used for communications with an identified neighbor wireless sensor device.

18. The one or more non-transitory tangible media of claim 15, wherein the drift compensation command to one or more of the wireless sensor devices specifies a listen command for promiscuous listening to an identified neighbor wireless sensor device at one or more prescribed times, the promiscuous listening enabling the one or more wireless sensor devices to synchronize to the identified neighbor wireless sensor device.

19. The one or more non-transitory tangible media of claim 15, wherein the drift compensation command to one or more of the wireless sensor devices specifies a forced beacon sync command for beacon synchronization by the one or more wireless sensor devices with an identified neighbor wireless sensor device at one or more prescribed times.

20. The one or more non-transitory tangible media of claim 15, wherein the drift compensation command to one or more of the wireless sensor devices specifies a leaf command that causes the one or more of the wireless sensor devices to reposition as a leaf node within the wireless sensor network.

* * * * *